United States Patent [19]

Yato et al.

[11] Patent Number: 4,754,456
[45] Date of Patent: Jun. 28, 1988

[54] MULTIPLEX SYSTEM FOR REPLACING A FAULTY MULTIPLEXER OUTPUT WITH AN ALTERNATING PATTERN SIGNAL

[75] Inventors: Yoshiaki Yato, Mitaka; Takeo Fukushima; Naonobu Fujimoto, both of Kawasaki, all of Japan

[73] Assignee: Fujitsu Limited, Kawasaki, Japan

[21] Appl. No.: 945,671

[22] PCT Filed: Mar. 27, 1986

[86] PCT No.: PCT/JP86/00148
§ 371 Date: Nov. 20, 1986
§ 102(e) Date: Nov. 20, 1986

[87] PCT Pub. No.: WO86/05939
PCT Pub. Date: Oct. 9, 1986

[30] Foreign Application Priority Data

Mar. 28, 1985 [JP] Japan ............... 60-064379
Apr. 9, 1985 [JP] Japan ............... 60-074729

[51] Int. Cl.⁴ ............... H04J 3/02
[52] U.S. Cl. ............... 370/112; 370/13; 370/100
[58] Field of Search ............... 370/112, 100, 77, 102, 370/13, 99

[56] References Cited

U.S. PATENT DOCUMENTS 4,535,451 8/1985 Drupsteen ............... 370/102
4,701,912 10/1987 Bueno et al. ............... 370/99

FOREIGN PATENT DOCUMENTS 2295650 7/1976 France .

OTHER PUBLICATIONS

IEEE International Conf. on Communications, May 14–17, 1984, New York; Stevenson et al.; "A 280 Mbit/s Monomode Optical Trunk Transmission System" pp. 790–795.
Elektronik, vol. 31, No. 22, Nov. 1982, Munchen; Marten: "Optische Sender Mit Halbleiterlasern Fur Hohe Bitraten" pp. 89–94.

Primary Examiner—Douglas W. Olms
Attorney, Agent, or Firm—Staas & Halsey

[57] ABSTRACT

A Multiplex system for further multiplexing signals output by low group multiplexers by means of a high group multiplexer. In this system, when at least one of the low group multiplexers is in a fault state, an alternating pattern signal is supplied to the high group multiplexer instead of the signal output by the faulty low group multiplexer, whereby the ratio of "0" and "1" of the signal output by the high group multiplexer becomes almost 1:1.

8 Claims, 7 Drawing Sheets

MULTIPLEX SYSTEM FOR REPLACING A FAULTY MULTIPLEXER OUTPUT WITH AN ALTERNATING PATTERN SIGNAL

BACKGROUND OF THE INVENTION

1. Field of the Invention

The present invention relates to an improvement of a multiplex system used in a hierarchical data transmission system in which a plurality of signals output by multiplexers are further multiplexed and transmitted to a transmission line, especially an optical transmission line.

2. Description of the Related Art

A hierarchical transmission system is known in which, for example, 9-channel data trains, each having a transmission rate of 45 Mb/s, are multiplexed by low group multiplexers to obtain a multiplexed data train of 405 Mb/s and, for example, two of these multiplexed data trains are further multiplexed by a high group multiplexer to obtain a multiplexed data train of 810 Mb/s, and this high group multiplexed data train is electro-optic converted by an optical interface circuit and transmitted to an optical transmission line, whereby a large amount of data transmission is performed. In this system, the output signals of the low group multiplexers are scrambled at the highest speed now possible, whereby the ratio of "1" and "0" of the output signal becomes almost equal.

In such a system, when one of the low group multiplexers becomes unavailable through a fault occurrence, the unavailable multiplexer outputs "0" or "1" continuously. Accordingly, the ratio of "0" and "1" of the output signal does not become equal.

However, when the unavailable low group multiplexer outputs, for example, "0" continuously, if the transmission rate of the system is very high and the number of low group multiplexers is small, for example, two, it is difficult to extract a timing clock from a received signal in the receiver side, therefore normal reception becomes impossible. On the other hand, when the unavailable low group multiplexer outputs "1" continuously, if this system is used in the optical transmission system, the lighting time of a light emission element, for example a semiconductor laser, becomes long in comparison with the case in which a fault does not occur, and accordingly, the lifetime of the light emission element is shortened.

SUMMARY OF THE INVENTION

Accordingly, an object of the present invention is to provide an improved multiplex system which can facilitate the extraction of the timing clock at the receiver side and prolong the lifetime of the light emission element at the transmitter side.

According to a fundamental aspect of the present invention, there is provided a multiplex system comprising a plurality of first multiplexers, a second multiplexer for further multiplexing signals output by the first multiplexers, means for generating an alternating pattern in synchronization with the signals output by the first multiplexer, and switching means provided for each of the first multiplexers for selectively outputting the signals output by the related first multiplexer or the alternating pattern to the second multiplexer, wherein the switching means related to the first multiplexer, the output signal of which is cut off, outputs the alternating pattern signal in place of the signal output by the first multiplexer.

According to another aspect of the present invention, there is provided a multiplex system comprising a plurality of first multiplexers, a second multiplexer for further multiplexing signals output by the first multiplexers, a generator for generating an alternating pattern signal in synchronization with the signals output by the first multiplexers, and a plurality of selectors provided for each of the first multiplexers for selecting the signal output by the related first multiplexer when the related first multiplexer assumes a normal state, and selecting the alternating pattern signal when the related first multiplexer assumes a fault state and outputting the selected signal to the second multiplexer.

According to another aspect of the present invention, there is provided a multiplex system comprising a plurality of first multiplexers, a second multiplexer for further multiplexing signals output by the first multiplexers, and means for supplying a selected signal to the second multiplexer, which means is provided for each of the first multiplexers, wherein the signal output by the related first multiplexer is selected when the related first multiplexer assumes a normal state, and an internally generated alternating pattern signal is selected when the related first multiplexer assumes a fault state.

According to another aspect of the present invention, there is provided a signal supplying circuit being capable of selectively outputting an external input signal or an internally generated alternating pattern signal, the circuit comprising a D type flip-flop, the output signal thereof being available as the output signal of the supplying circuit, a NOR gate having two input terminals, wherein the output signal of the D type flip-flop is input to one terminal and a mode changing signal is input to the other, and an OR gate having two input terminals, wherein the external input signal is input to one terminal and the output signal of the NOR gate is input to the other.

BRIEF DESCRIPTION OF THE DRAWINGS

Embodiments of a multiplex system according to the present invention will be described with reference to the accompanying drawings, in which.

DESCRIPTION OF THE PREFERRED EMBODIMENTS

Figure 1:
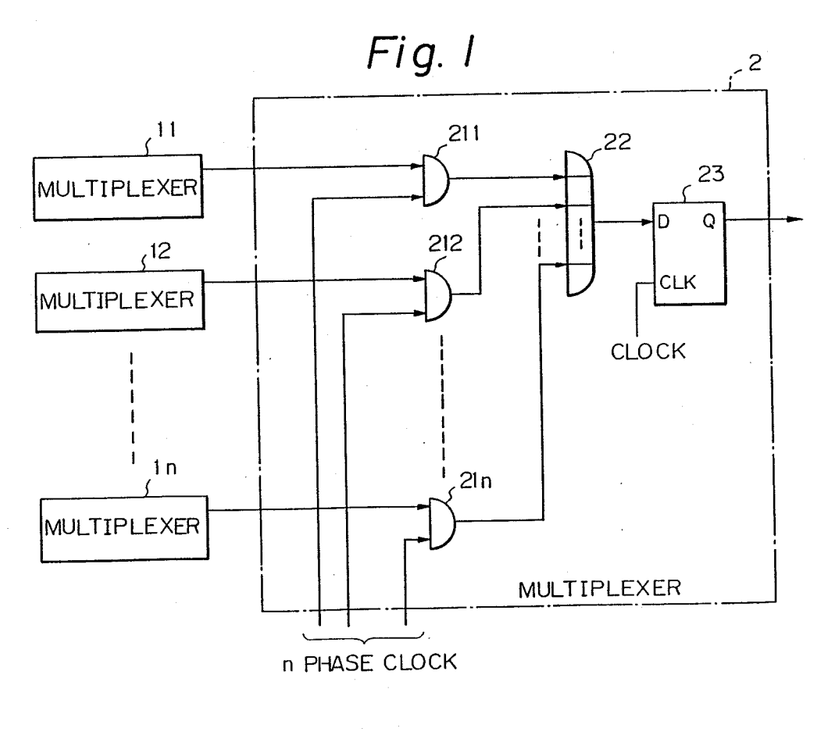
FIG. 1 is a block diagram of a prior art multiplex system.

Before describing the embodiments of the present invention, a prior art and the disadvantages therein will be described. FIG. 1 is a block diagram of a multiplex system of the prior art. In FIG. 1, 11 to 1n are n number of low group digital multiplexers, 2 a high group multiplexer. The multiplexer 2 comprises AND gates 211 to 21n, an OR gate 22, and a flip-flop 23. Each of AND gates 211 to 21n has two input terminals, to one of which a data signal output by the related multiplexer is led and to the other a clock having an n multiplied clock rate of the timing clock of multiplexers 11 to 1n, i.e. n phase clock of multiplexers 11 to 1n. Output signals of the AND gates 211 to 21n are led to the flip-flop 23 for shaping the waveform.

In the FIG. 1 system, a further multiplex of the output signals of multiplexers 211 to 21n is performed by opening AND gates 211 to 21n in sequence to send these data signals of the multiplexers 211 to 21n in sequence to the flip-flop 23 to shape the waveform.

However, in the FIG. 1 system, if one of multiplexers 11 to 1n becomes unavailable due to a fault, that unavailable multiplexer outputs "0" or "1" sequentially, as a result, the ratio of "0" and "1" of the signal output by the multiplexer 2 does not become equal. Therefore, extraction of the timing clock at the receiver side becomes difficult and the lifetime of the light emission element at the transmitter side is shortened.

Figure 2:
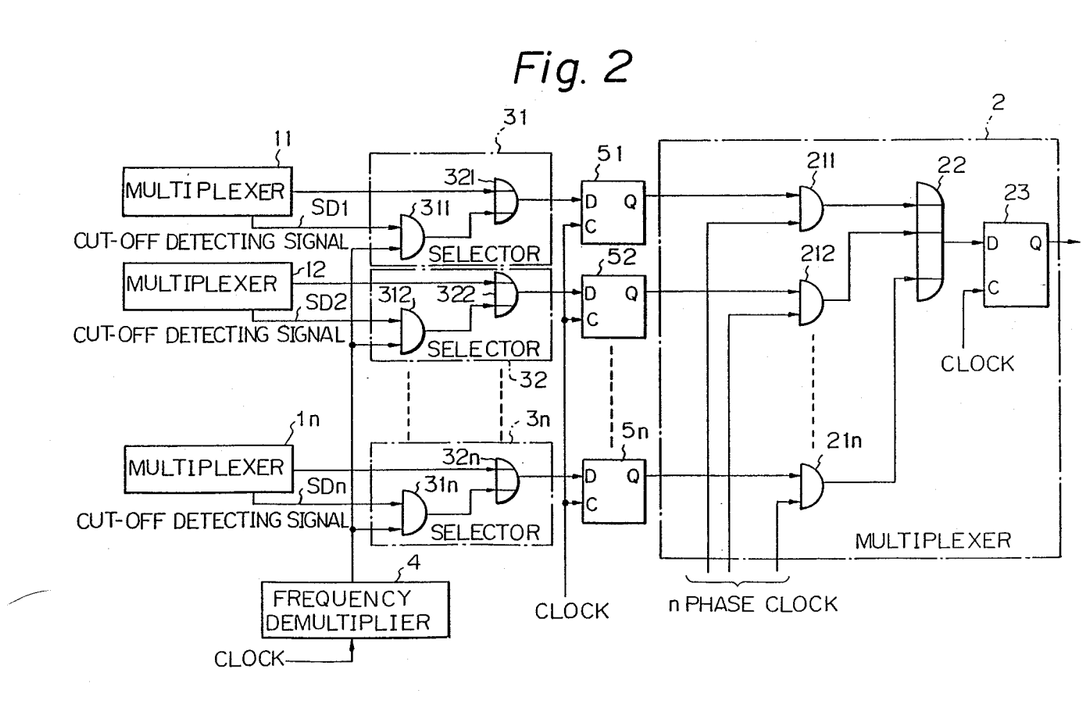
FIG. 2 is a block diagram of an embodiment of a multiplex system according to the present invention.

FIG. 2 illustrates an embodiment of a multiplex system according to the present invention. In FIG. 2, 11 to 1n are n units of digital low group multiplexers, 2 a high group multiplexer, 31 to 3n n selectors, 4 a ½ frequency demultiplier as a pattern generator, and 51 to 5n D type flip-flops for shaping the waveform. In all later figures, the same reference characters represent the same components.

The multiplexers 11 to 1n output a multiplexed data train of a low group as an output signal respectively. These multiplexed data trains are scrambled by each of the multiplexers respectively, therefore, the ratio of "0" and "1" of the output signal in a normal state becomes almost 1:1. When these multiplexers 11 to 1n become unavailable due to a fault, these multiplexers 11 to 1n output "0" continuously. These multiplexers 11 to 1n are provided with a fault detector which detects the fault and outputs an output cut-off detecting signal at a continuous "1" level. Of course, this fault detector may be equipped outside of the multiplexers 11 to 1n.

Selectors 31 to 3n are provided for each of the multiplexers 11 to 1n respectively, and comprises AND gates 311 to 31n and OR gates 321 to 32n respectively. In selectors 31 to 3n, the AND gates 311 to 31n have two input terminals. The detecting signals SD1 to SDn from multiplexers 11 to 1n are respectively led to one of the input terminals of the AND gates 311 to 31n, and the alternating pattern signal from the frequency demultiplier 4 is input to the other input terminal thereof. Also, OR gates 321 to 32n have two input terminals, and the data signals output by the multiplexers 11 to 1n are respectively led to one of the input terminals and output signals of the AND gates 311 to 31n are respectively led to the other terminal thereof.

These selectors 31 to 3n select the data signals output by multiplexers 11 to 1n when the detecting signals SD1 to SDn are "0" respectively, select the alternating pattern signal from the frequency demultiplier 4 when the detecting signals are "1" respectively, and supply the selected signals to the multiplexer 2 via flip-flops 51 to 5n respectively.

The ½ frequency demultiplier 4 divides the timing clock of the multiplier by 2 in frequency, thereby outputting the alternating patterns signal which alternates "0" and "1" at one-half the frequency of the timing clock. The flip-flops 51 to 5n are operated by the timing clock of the multiplexers 11 to 1n to shape the waveform of the input signal.

The multiplexer 2 is the same as that shown in FIG. 1. The output signal of the multiplexer 2 is supplied to the optical interface circuit (not shown) which includes a light emission element such as the semiconductor laser, and then transmit it to the optical transmission line.

Figure 3:
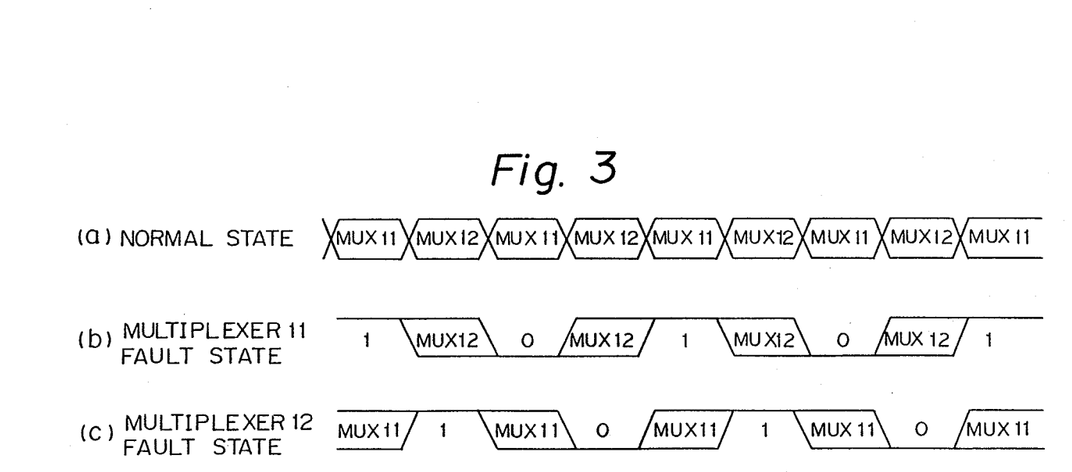
FIG. 3 and FIG. 4 show time charts of signal-waveforms for explaining the operation of the system shown in FIG. 2.
Figure 4:
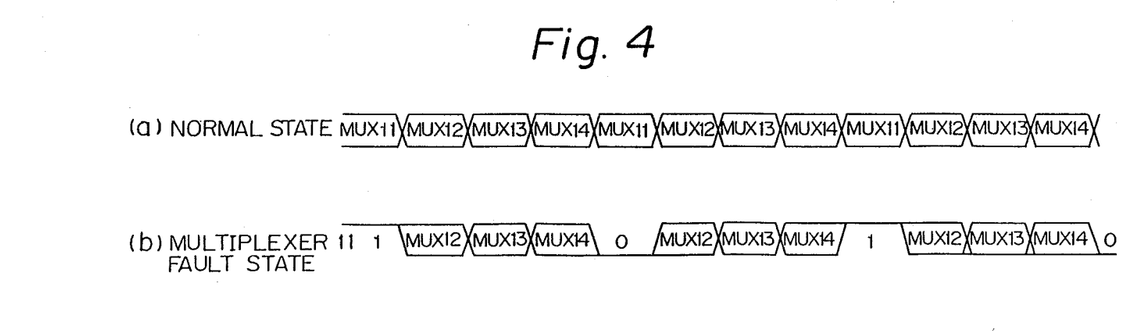

The mode of operation of the system shown in FIG. 2 will now be described by referring to FIG. 3 and FIG. 4. In the normal state, multiplexers 11 to 1n output a data signal, and the output cut-off detecting signals SD1 to SDn are "0". Accordingly, selectors 31 to 3n select the data signals from the multiplexers 11 to 1n, and supply them to the multiplexer 2 via the flip-flop 51 to 5n. In this case, as shown in FIG. 3 (a) and FIG. 4 (a), the output signal of the multiplexer 2 repeats the data signals from the multiplexers 11 to 1n in sequence. FIG. 3 shows the time chart of the signal output by the multiplexer 2 when the number n of the multiplexers 1 to 1n is 2, and FIG. 4 shows the same when the number n is 4. The ratios of "0" and "1" of the signals output by the multiplexers 11 to 1n are 1:1, since these signals are scrambled.

Now if, for example, the multiplexer 11 becomes unavailable due to a fault, the data signal output by the multiplexer 11 becomes "0" and at the same time the detecting signal SD1 becomes "1". Therefore, the selector 31 selects the alternating pattern signal of the frequency demultiplier 4 instead of the output signal of the multiplexer 11 and supplies it to the multiplexer 2 via the flip-flop 51.

As a result, as shown in FIG. 3(b) and FIG. 4(b), the data portion of the multiplexer 11 in the output signal of the multiplexer 2 alternates "0" and "1" in sequence, and therefore the ratio of "0" and "1" of the signal output by the multiplexer 2 becomes almost 1:1 in spite of the fault at the multiplexer 11. Accordingly, the extraction of the timing clock at the receiver side becomes easy, and if this system is used in the optical data transmission system, the lifetime of the light emission element becomes longer in comparison with the case where a continuous "1" is output from the unavailable multiplexer 1.

Figure 5:
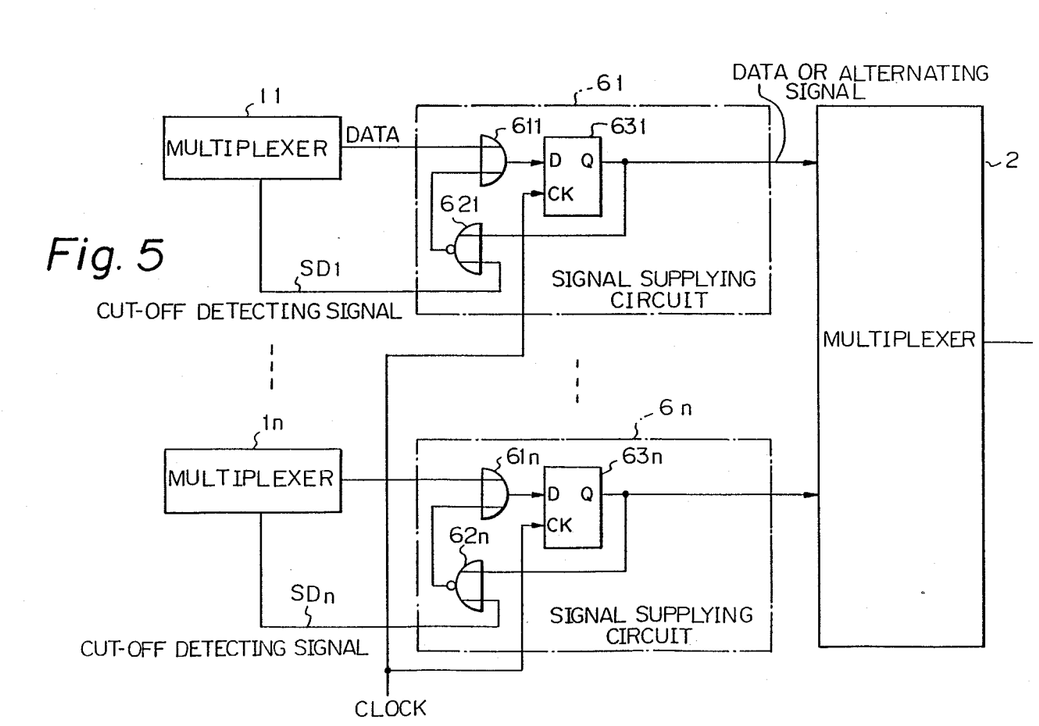
FIG. 5 is a block diagram of another embodiment according to the present invention.

FIG. 5 illustrates another embodiment of the multiplex system according to the present invention. In the system shown in FIG. 5, the selection function of the selectors, the alternating pattern generating function of the frequency demultiplier, and the waveform shaping function of the flip-flop in the FIG. 2 system are realized by one circuit, i.e., a signal supplying circuit, thereby reducing the number of components and adapting for a high transmission rate. In FIG. 5, the system comprises multiplexers 11 to 1n, signal supplying circuits 61 to 6n provided for each of the multiplexers 11 to 1n, and the multiplexers 2. The multiplexers 11 to 1n and multiplexer 2 have the same function as those of FIG. 2 except that the output cut-off detecting signals SD1 to SDn from the multiplexers 11 to 1n are "1" level in the normal state and "0" level in the fault state.

Signal supplying circuits 61 to 6n comprise OR gates 61 to 6n, NOR gates 621 to 62n, and flip-flops 631 to 63n respectively. Data signals output by the multiplexers 11 to 1n are led to one of the input terminals of the OR gates 611 to 61n respectively. Output signals of the OR gates 611 to 61n are led to data input terminals of the flip-flops 631 to 63n respectively. Output signals Q of the flip-flop 631 to 63n are led to the multiplexer 2 at the same time to one of the input terminals of the NOR gates 621 to 62n respectively. The detecting signals SD1 to SDn are led to the other input terminals of the NOR gates 621 to 62n respectively. Output signals of the NOR gates 621 to 62n are led to the other input terminals of the OR gates 611 to 61n respectively. The timing clock of the multiplexers 11 to 1n is led to the clock input terminals of the flip-flops 631 to 63n.

Figure 6:
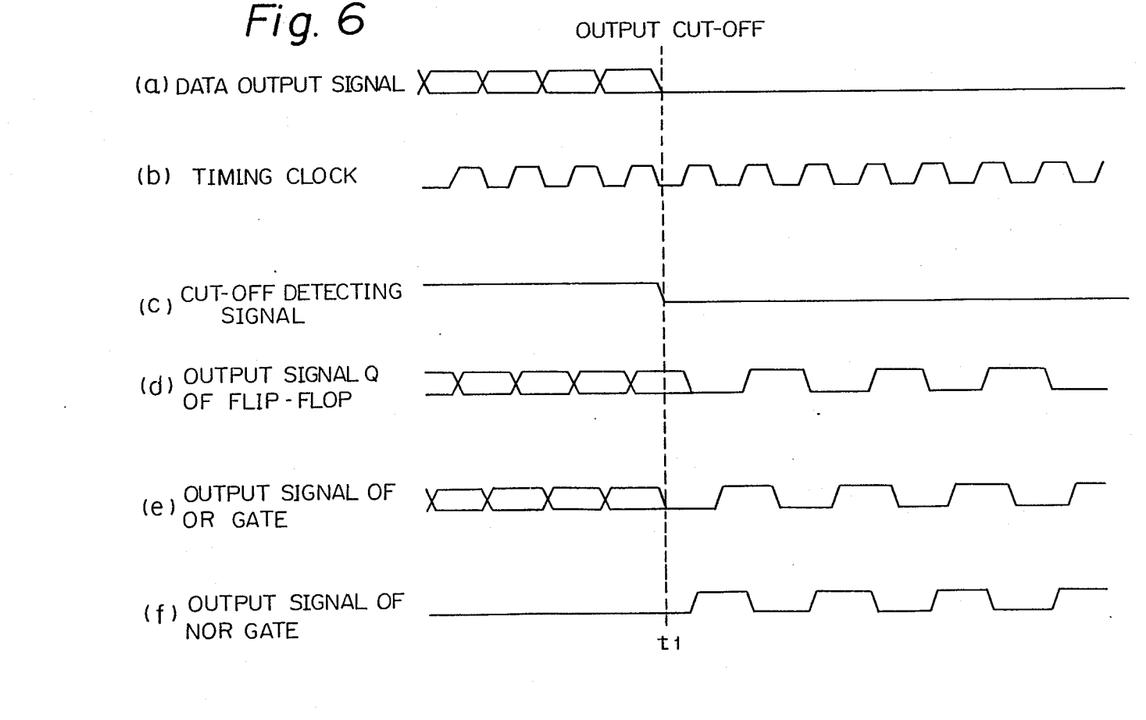
FIG. 6 is a time chart of the signal-waveform of the FIG. 5 system.

The operation of the system shown in FIG. 5 will be described hereinafter. As an example, the operation of the signal supplying circuit 61 will be described. FIG. 6 is a time chart of the signal waveforms of the circuit 61. In FIG. 6, (a) represents the date output signal from the multiplexer 11, (b) a low group timing clock, (c) an output cut-off detecting signal SD1 from the multiplexer 11, (d) an output signal of the flip-flop 631, (e) an output signal of the OR gate 611, and (f) an output signal of the NOR gate 621.

In the normal state, the NOR gate 621 is closed, since the output cut-off detecting signal SD1 is "1". Therefore, the data signal output by the multiplexer 11 is input to the flip-flop 631 via the OR gate 611. The flip-flop 631 shapes the waveform of the data output signal and then sends it to the multiplexer 2.

On the other hand, when the multiplexer 11 becomes unavailable due to a fault at time t1, the data output signal thereof is cut-off, i.e., becomes "0" continuously, and at the same time, the detecting signal SD1 changes from "1" to "0", whereby the NOR gate 621 is opened. Therefore, the output signal Q of the flip-flop 631 is reversed by the NOR gate 621 and fed back to the data input terminal D of the flip-flop 631 via the OR gate 611. As a result, the flip-flop 631 operates as a ½ frequency demultiplier, i.e., a binary counter, and outputs an alternating signal, obtained by dividing the frequency of the timing clock by two, to the multiplexer 2 instead of the data signal output by the multiplexer 11.

Accordingly, the output signal of the signal supplying circuit 61 has the ratio of "0" and "1" of almost 1:1. Using this signal supplying circuit, a single flip-flop is commonly used as the flip-flop for frequency dividing and the flip-flop for waveform shaping, whereby the number of the components is reduced in comparison with the FIG. 2 system, and the system may be adapted for the high rate transmission system.

Figure 7:
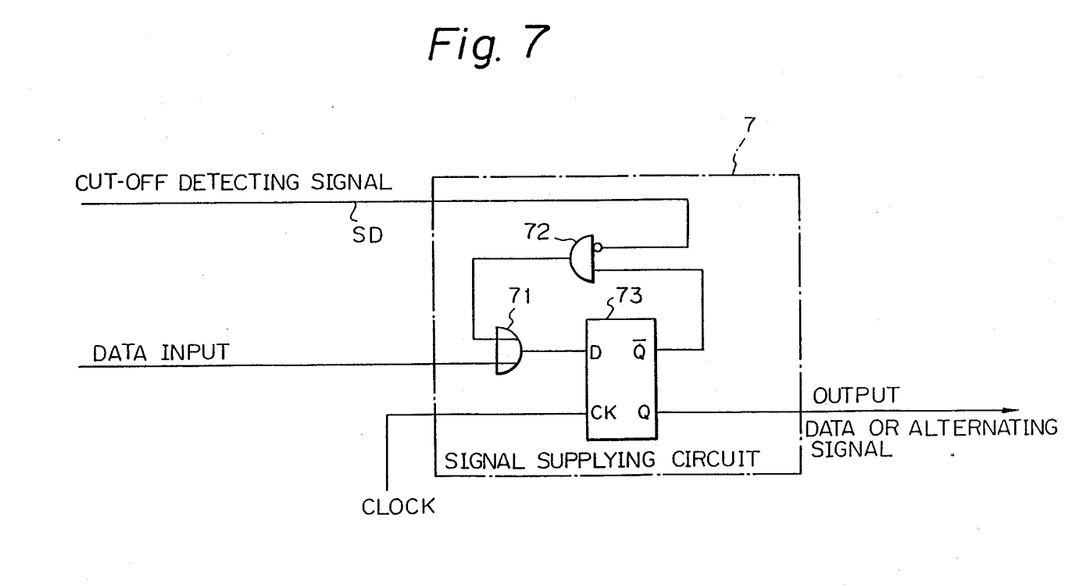
FIG. 7 and FIG. 8 are block diagrams of further embodiments according to the present invention.

FIG. 7 illustrates another embodiment of the signal supplying circuit according to the present invention. In FIG. 7, an inverted output signal $\overline{Q}$ of a flip-flop 73 is fed back to a data input terminal thereof via an AND gate 72 and OR gate 71. The output cut-off detecting signal SD is led to an inverting input terminal of the AND gate 72. This signal supplying circuit also outputs the alternating pattern signal instead of the data signal from the low group multiplexer when the detecting signal SD becomes "0".

Figure 8:
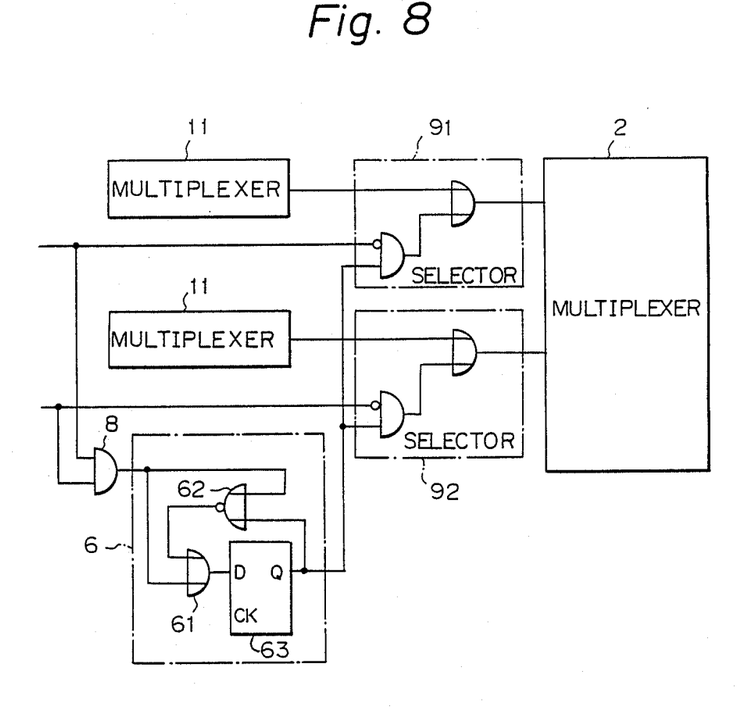

FIG. 8 illustrates another embodiment of the multiplex system according to the present invention in which the signal supplying circuit of FIG. 6 is utilized as the alternating pattern generator. In FIG. 8, 8 is an AND gate, 6 the signal supplying circuit, and 91 and 92 selectors. As shown in FIG. 8, the output cut-off detecting signals SD1 and SD2 are led to the AND gate 8 to obtain the logical product thereof, and the output signal of the AND gate 8 is led to the input terminals of OR gate 61 and NOR gate 62. This signal supplying circuit 6 outputs the alternating signal to the selectors 91 and 92 when at least one of the detecting signals SD1 and SD2 become "0".

Although preferred embodiments have been described, various modifications and alterations are possible within the scope of the present invention.

As can be seen from the above description, a multiplex system according to the present invention can be used in a hierarchical data transmission system in which a plurality of signals output by multiplexers are further multiplexed and transmitted to a transmission line, especially an optical transmission line.

We claim:

1. A multiplex system, comprising:
   a plurality of first multiplexers having outputs supplying data signals;
   a second multiplexer for multiplexing a parallel input signal by simply converting the parallel input signal to a serial output signal;
   a pattern generator for generating an alternating pattern signal in synchronization with the signals output by said first multiplexers; and
   a plurality of selectors, each operatively connected to said pattern generator, said second multiplexer and the output of a corresponding one of said first multiplexers, for selecting the data signal output by the corresponding first multiplexer when the corresponding first multiplexer assumes a normal state and selecting the alternating pattern signal when the corresponding first multiplexer assumes a fault state and for outputting signals selected thereby to said second multiplexer as the parallel input signal.

2. A multiplex system according to claim 1, wherein a timing clock signal controls said first multiplexers, and wherein said pattern generator comprises a frequency demultiplier for dividing the timing clock signal of said first multiplexers by two.

3. A multiplex system according to claim 1, wherein each of said first multiplexers further outputs a fault indicating signal when in the fault state, and wherein each of the selectors comprises:
   an AND gate having two input terminals and supplying an output signal at an output terminal, the alternating pattern signal from said pattern generator being supplied to one of the input terminals and the fault indicating signal of the corresponding first multiplexer being input to the other of the input terminals; and
   an OR gate having two input terminals and an output terminal operatively connected to said second multiplexer, the output signal from said AND gate being input to one of the input terminals and the data signal from the corresponding first multiplexer being input to the other of the input terminals.

4. A multiplex system according to claim 1, wherein each of the signals output by the selectors is input to the second multiplexer via a D-type flip-flop for waveform shaping.

5. A multiplex system comprising:
   a plurality of first multiplexers having outputs supplying data signals;
   a second multiplexer for multiplexing a parallel input signal by simply converting the parallel input signal to a serial output signal; and
   means for supplying selected signals as the parallel input signal to said second multiplexer, each of said means corresponding to one of said first multiplexers, the data signal output by the corresponding first multiplexer being selected when the corresponding first multiplexer assumes a normal state, and an alternating pattern signal generated by said supplying means being selected when the corresponding first multiplexer assumes a fault state.

6. A multiplex system according to claim 5,
wherein a timing clock signal controls said first multiplexers, and
wherein each of said supplying means includes a D-type flip-flop operated by the timing clock signal of said first multiplexers and having an input operatively connected to receive the data signal output by the corresponding first multiplexer the data signal being wave-shaped by said D-type flip-flop and supplied to said second multiplexer when the corresponding first multiplexer assumes a normal state, the alternating pattern signal, having a period equal to one-half of the timing clock rate of said first multiplexers, being generated by leading the polarity-reversed output signal of the D-type flip flop to a data input terminal thereof and supplied to the second multiplexer when the corresponding first multiplexer falls into a fault state.

7. A multiplex system according to claim 5,
wherein a timing clock signal controls said first multiplexers,
wherein each of said first multiplexers further outputs a fault indicating signal when in the fault state, and
wherein each of said supplying means comprises:
a D-type flip-flop having a data input terminal and an output for supplying a wave-shaped signal to said second multiplexer as part of the parallel input signal;
a selecting gate having two input terminals and supplying an output signal at an output terminal, the wave-shaped signal from said D-type flip-flop being input to one of the input terminals and the fault indicating signal of the corresponding first multiplexer being input to the other of the input terminals; and
an OR gate having two input terminals, the data signal of the corresponding first multiplexer being input to one of the input terminals and the output signal from said selecting gate being input to the other of the input signals, for supplying output signal to the data input terminal of the said D-type flip-flop.

8. A multiplex system according to claim 5,
wherein each of said first multiplexers further outputs a fault indicating signal when in the fault state, and
wherein said supplying means comprises:
a D-type flip-flop, having data input, output and polarity-reversed output terminals, for supplying an output signal from the output terminal as part of the parallel input signal to said second multiplexer;
a selecting gate, having a first input terminal operatively connected to the polarity-reversed output terminal of said D-type flip-flop, a second input terminal operatively connected to receive the fault indicating signal from the corresponding first multiplexer, for outputting a selected signal; and
an OR gate having a first input terminal operatively connected to receive the selected signal from said selecting gate, a second input terminal operatively connected to receive the data output signal from the corresponding first multiplexer and an output terminal operatively connected to the data input terminal of said D-type flip-flop.

* * * * *